United States Patent [19]

Ossian et al.

[11] Patent Number: 5,683,619

[45] Date of Patent: *Nov. 4, 1997

[54] DE-ICING COMPOSITION AND METHOD FOR MAKING SAME

[75] Inventors: Kenneth C. Ossian, Bettendorf; Norbert J. Steinhauser, Dubuque, both of Iowa

[73] Assignee: Ossian, Inc., Davenport, Iowa

[*] Notice: The term of this patent shall not extend beyond the expiration date of Pat. No. 5,599,475.

[21] Appl. No.: 788,373

[22] Filed: Jan. 27, 1997

Related U.S. Application Data

[63] Continuation-in-part of Ser. No. 529,007, Sep. 15, 1995, Pat. No. 5,599,475.

[51] Int. Cl.$^6$ ............................................. C09K 3/18
[52] U.S. Cl. ............................ 252/70; 106/13; 23/313 P; 264/117; 428/403
[58] Field of Search ............................ 106/13; 252/70; 428/403; 264/117; 23/313 P

[56] References Cited

U.S. PATENT DOCUMENTS

| Re. 32,477 | 8/1987 | McConnell | 252/70 |
|---|---|---|---|
| 2,308,289 | 8/1943 | Lawrence | 117/100 |
| 2,716,068 | 8/1955 | Fain et al. | 106/13 |
| 2,988,509 | 6/1961 | Schilberg | 252/70 |
| 4,094,805 | 6/1978 | Hansen | 252/70 |
| 4,148,938 | 4/1979 | Hansen | 252/70 |
| 4,431,558 | 2/1984 | Wada et al. | 252/70 |
| 4,512,907 | 4/1985 | McConnell | 252/70 |
| 4,606,835 | 8/1986 | Lieber et al. | 252/70 |
| 4,676,918 | 6/1987 | Tóth et al. | 252/70 |
| 4,778,615 | 10/1988 | Jeglic | 252/70 |
| 4,877,458 | 10/1989 | Trop | 134/5 |
| 4,960,531 | 10/1990 | Connor et al. | 252/70 |
| 5,057,159 | 10/1991 | Weintraub | 134/5 |
| 5,079,036 | 1/1992 | Roe et al. | 427/212 |
| 5,135,674 | 8/1992 | Kuhajek et al. | 252/70 |
| 5,211,869 | 5/1993 | Steinhauser et al. | 252/70 |
| 5,366,650 | 11/1994 | Wiesenfeld et al. | 252/70 |
| 5,453,212 | 9/1995 | Annemaier et al. | 252/70 |
| 5,482,638 | 1/1996 | Archer et al. | 252/70 |
| 5,599,475 | 2/1997 | Ossian et al. | 106/13 |

FOREIGN PATENT DOCUMENTS

| 1217040 | 9/1987 | Canada . |
|---|---|---|
| 93/00205 | 2/1993 | Denmark . |
| 490796 | 12/1990 | European Pat. Off. . |
| 2849810 | 11/1978 | Germany . |
| 3141644 | 9/1993 | Germany . |
| 037810 | 6/1984 | Hungary . |
| 043341 | 10/1987 | Hungary . |
| 49003853 | 5/1972 | Japan . |
| 60-195178 | 8/1984 | Japan . |
| 62141091 | 12/1985 | Japan . |
| 63086791 | 9/1986 | Japan . |
| 63097683 | 10/1986 | Japan . |
| 01163285 | 3/1987 | Japan . |
| 63-236802 | 3/1987 | Japan . |
| 63-117089 | 5/1988 | Japan . |

OTHER PUBLICATIONS

Golec, J., et al., 1980, Corrosive Aggressiveness Of Anti–Freeze Chemical Agents, *Ochr. Koroz*, 23(1) 9–12 (abstract, 55 *Ferrous Metals* 93:337) No Month.

Pelikan, J., 1980, Corrosion Of Concrete In The Presence Of Deicing Agents, *Razrab. Mer Zashch. Met. Korroz., Mezdunar. Nauchno–Tekh. Kinf. Probl. SEV* 3rd ed. 5:270–3 (abstract *Chemical Abstracts*, 95:298 (1981) no month.

Tamakawa, K., Corrosion Of Metals By Snow–Melting Agents, *Sendai–shi Eisei Shikenshoho* 1985 (Pub. 1986) (14), 293–6, (abstract *56–Noferrous Metals*, 106:263 (1987) no month.

Sugawara, M. The Temperature–Concentration Combined Melting Of A Horizontal Ice Layer By An Aqueous Solution With A Low Solidification Temperature, *Nippon Kikai Gakkai Ronbunshu, B–hen* 1987, 51(484), 4041–5 (abstract *48–Unit Operations, Processes* 106:129 (1987) no month.

Katawaki, K., Recent Development Of Deicing Agents Used In Road Pavement, *Nippon Kaisui Gakkaishi* 1991, 45(4), 211–21;58–*Cement, Concrete and Related Building Materials* p. 388 no month.

Kirschner, H., Comparative Study Of Chemical Deicers: Undercutting And Disbondment, *Chem. Deicers Environ*, 1992, 495–518; (abstract 58–*Cement, Concrete*, vol. 119, p. 389 (1993) no month.

Ludwig, U., Effect of Cement Type and Quality on Freeze–Thaw Resistance and Deicing–Salt Resistance of Concrete, *Wiss. Z–Hochsch. Archit. Bauwes. Weimar–Univ.* 1994, 40(5/6/7), 133–7; (abstract 58–*Cement, Concrete, and Related Building Materials*, 124(6):597 (1996) no month.

*Primary Examiner*—Anthony Green
*Attorney, Agent, or Firm*—Zarley, McKee, Thomte, Voorhees, & Sease

[57] ABSTRACT

A method of making a vegetation-friendly ice melting composition with sub-zero ice melting characteristics is described. The method of making the composition includes mixing from about 60–90 parts by weight non-fully hydrated ice melter, which is preferably calcium chloride with from about 10–40 parts by weight of fertilizer, which is preferably urea. The most preferred composition is about 70 parts by weight of calcium chloride and about 30 parts by weight urea. The calcium chloride and urea are preferably admixed first to coat the calcium chloride. To this mixture is added a measured amount of powdered non-fully hydrated calcium chloride as a solid coatant. The non-fully hydrated calcium chloride by hydration forms a coating around the ice melt base. The resultant mixture is discharged from the mixer, screened and packaged.

13 Claims, 1 Drawing Sheet

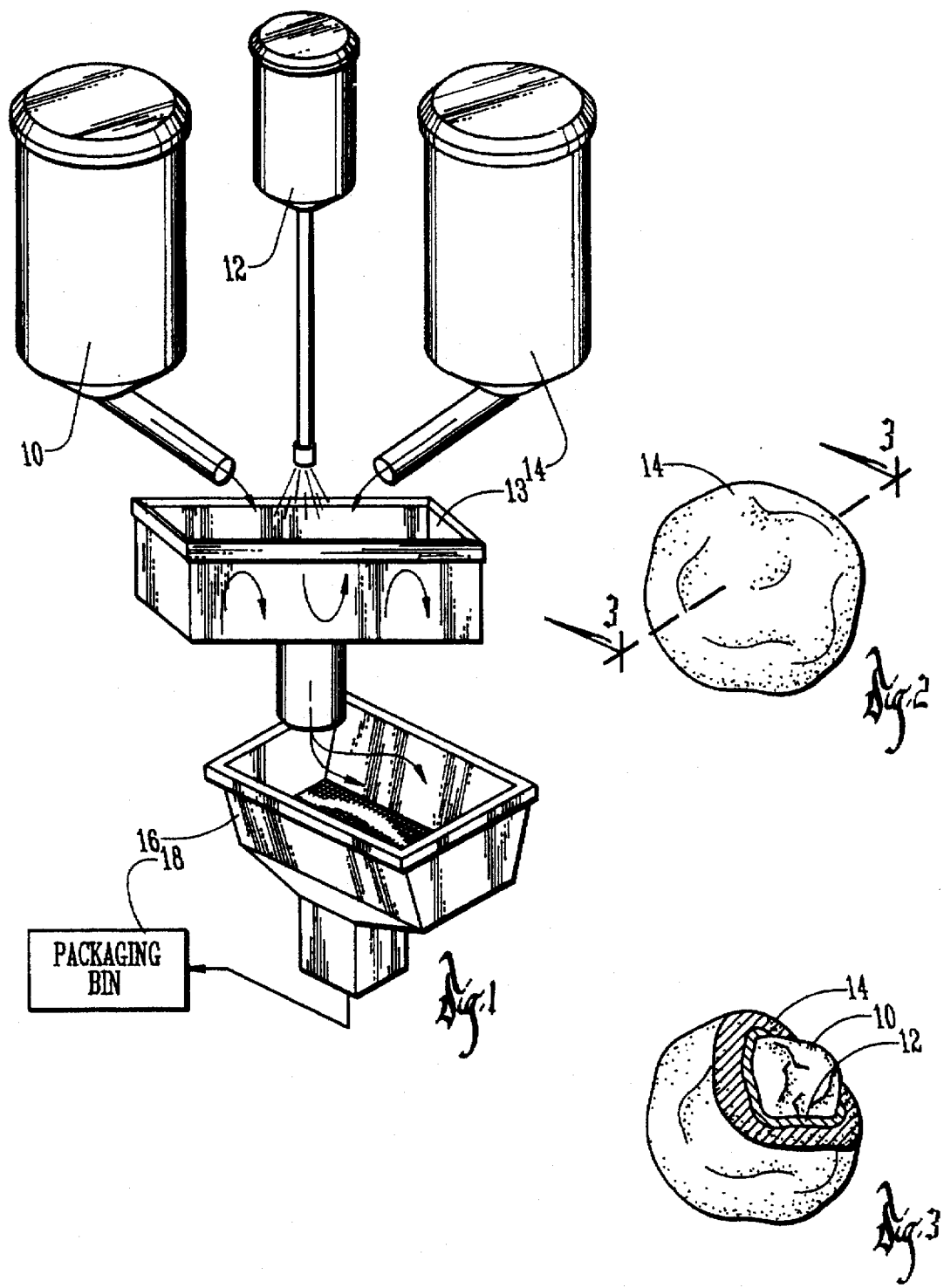

DE-ICING COMPOSITION AND METHOD FOR MAKING SAME

CROSS-REFERENCE TO RELATED APPLICATIONS

This application is a continuation-in-part of application Ser. No. 08/529,007 filed Sep. 15, 1995, now U.S. Pat. No. 5,599,475.

BACKGROUND OF THE INVENTION

The present invention relates to compositions for melting ice on surfaces such as streets, parking lots, sidewalks, etc.

There are many products now used for melting ice and snow. These products can be, but are not limited to, hygroscopic salts such as calcium chloride and magnesium chloride; fertilizers such as potassium chloride and urea; and rock salt and non-slip aggregates like sand, cinders and calcined diatomaceous earth absorbents.

These current commercial products have their advantages and disadvantages. For example, the hygroscopic salts are excellent low-temperature melters, but are expensive and cause slippery conditions when overused.

Fertilizers cause minimal problems on runoff as they will aid surrounding vegetation, but as ice melters they have very poor characteristics. For instance, the practical melting temperature (the lowest temperature that observable melting action takes place in 20 minutes) of fertilizers such as potassium chloride and urea is only 20°–25° F. above zero. In addition, the user often mistakenly assumes that fertilizer is safe on vegetation as an ice melter. However, since a much higher concentration of fertilizer is required to melt ice than is required for fertilization purposes, the application of fertilizer as an ice melter can cause vegetation burn. For instance, one application of potassium chloride as an ice melter exceeds the recommended maximum concentration for fertilizer by 5–10 times. Studies indicate that vegetation damage can occur after only 2–4 applications of fertilizer when used in ice-melting-sufficient concentrations.

Further, while rock salt is inexpensive, it will kill vegetation on heavy runoff and has poor ice melting properties. Aggregates, like sand, do not melt or solubilize, and therefore have difficulty embedding into ice to provide a non-slip surface.

To address some of these disadvantages, blends have been employed, but each ingredient acts independently with little to no synergistic effect. Agglomerates such as shown in our previous patent, U.S. Pat. No. 5,211,869 issued May 18, 1993, the disclosure of which is incorporated herein by reference, have been successful, but they are complex in their manufacture and are limited in their ability to synergistically coact with a wide range of base materials.

In addition, other ice melters which have been successful in their ability to melt ice still have detrimental effects on vegetation Accordingly, there is a need for a new ice melting composition, and method for making the same, which allows for a coacting synergistic relationship between the ingredients to provide a commercially acceptable, flowable product at economic prices, and a product that effectively allows good ice melt, favorable abrasion or grip properties, and which avoids undesirable environmental problems caused by runoff, such as vegetation kill. This invention has as its primary objective the fulfillment of this need.

The method and manner of accomplishing this primary objective as well as other objectives will be apparent from the description below.

SUMMARY OF THE INVENTION

This invention relates to an improved de-icing composition and to a method of making that de-icing composition which allows the ingredients of the de-icing composition to synergistically coact so that the final composition, although using individually known ingredients, allows each ingredient to contribute to a desirable overall result. The desirable result is an excellent de-icer with favorable abrasion or gripping properties, and a de-icer which avoids undesirable environmental problems caused by spill, runoff, etc., while at the same time being commercially acceptable in that it has good packaging and free flow properties. The process involves making a solid ice-melting agent which includes conventional ice melters, abrasives and absorbents, mixing this solid ice melting agent with an adhering solution followed by a quick mix with a solid coating effective amount of a non-fully hydrated calcium chloride. As a result, the calcium chloride picks up additional water of hydration, forms a plastic-like mass which coats around the wetted material to provide the final composition which may then be screened and packaged.

The present invention also includes an ice-melting formulation which is vegetation-friendly. In this embodiment, the ice melting composition comprises from about 60–90 parts calcium monohydrate and from about 10–40 parts urea. The composition preferably comprises from about 70–80 parts calcium chloride and from about 20–30 parts urea. The final ice melting composition has excellent ice melting characteristics and limits damage to turf grass while providing a greening effect to vegetation.

BRIEF DESCRIPTION OF THE DRAWINGS

FIG. 1 shows a schematic representation of a typical process for making the product of the present invention.

FIG. 2 shows a typical particle having the solid coatant of the plastic-like mass of non-fully hydrated calcium chloride.

FIG. 3 is a sectional view of the particle of FIG. 2 along line 3—3.

DETAILED DESCRIPTION OF THE INVENTION

An important aspect of the process involves the sequence of operations which includes depositing dry material to be coated into a mechanical stirring device, applying an adhering solution to the dry material to uniformly wet it and, while mixing, adding as a solid coatant material non-fully hydrated calcium chloride, followed by a quick mix for a time sufficient to coat and plasticize and finally discharge to a screening and packing operation.

Key steps and components of the process and composition are:

(1) Dry material to be coated;
(2) An aqueous adhering solution;
(3) Vegetation-friendly ice-melting composition;
(4) The mechanical stirring step; and
(5) The solid coatant material which is non-fully hydrated calcium chloride.

Each is discussed in detail below.

(1) Dry Material to be Coated

This composition component can be divided into three classes of materials, i.e. ice melters, abrasives and absorbents. First are commercially available solid ice melting products such as, but not limited to, urea, potassium chloride, and sodium chloride. The second are dry materials that do not melt, but are used for their abrasive or anti-slip properties such as, but not limited to, sand, cinders and gravel. The third are calcined diatomaceous earth absorbents which also contribute to anti-slip, since they absorb moisture.

In the dry material mix different components may be used, depending on the intended end market. For example, a street or parking lot would utilize sodium chloride coated with calcium chloride for economy. However, if runoff would end up in sensitive vegetation growth, one would want to substitute potassium chloride and/or urea for sodium chloride. On new concrete, one would need to control the liquid brine generated in the melting action.

The ice melting composition may further contain abrasives, for example, for use on a steep hill. This type of composition would need assistance in embedding into the ice. The potential for the various dry material mix is unlimited to tailor the product to the specific end use. For present purposes, we have utilized various known products used for de-icing, traction and absorption for winter time needs. It is not our intention to limit the list to the following:

|  | *% by weight range | ideal range |
| --- | --- | --- |
| Ice melters |  |  |
| Sodium Chloride | 60% to 99% | 75% to 95% |
| Potassium chloride | 60% to 99% | 75% to 95% |
| Urea | 50% to 99% | 60% to 95% |
| Abrasives |  |  |
| Sand | 60% to 99% | 70% to 95% |
| Gravel | 60% to 99% | 70% to 95% |
| Absorbents | 50% to 99% | 60% to 90% |
| Calcined |  |  |
| Diatomaceous Earth |  |  |

Turning next to the bonding of calcium chloride powder on urea plus heat and use of no aqueous adhering solution, bonding of calcium chloride powder on urea can be achieved without an adhering solution because of the low melting point of urea. To begin with, urea is placed in a heated mixer with calcium chloride powder, or the powder can be added later.

The mixer is heated to approximately 180° F. At this stage urea will become sticky and tacky and the calcium chloride easily adheres to the urea base. When all the calcium chloride is bonded, the heat is reduced, the material cooled and packaged. In this process the calcium chloride percentages can vary from 1% to 40%. However, at the higher percentages it may be necessary to increase the heat beyond 180° F. to get total bonding. This process produces a stable product, but is more expensive in energy consumption and more difficult to manufacture. The process of choice to bond calcium chloride powder to urea would be by the use of a coating solution that is covered in detail later.

(2) An Aqueous Adhering Solution

Water by itself is sufficient to function as the adhering solution. However, the addition of various hygroscopic ice melting agents into the aqueous adhering solution is preferred since it enhances the product sheen, promotes long term storage, reduces the amount of water required, strengthens the bonding action, and eliminates much of the fines generated in the mixing process.

These hygroscopic ice melting agents as solutions can be used individually or in combination in an overall aqueous adhering solution. These hygroscopic agents include, but are not limited to, the following: urea, potassium acetate, calcium chloride and magnesium chloride. As a group these hygroscopic agents assist in tying up some of the water when the end product reaches equilibrium, thereby enhancing long-term storage. Also, they add a syrupy, tacky consistency to the adhering solution that reduces the required amount of water to hydrate the calcium chloride. They also strengthen the bonding action, and eliminate the majority of fines in the mixing process.

As mentioned, water by itself is sufficient as the adhering or wetting solution to coat calcium chloride powder around the various dry material mixtures. A weight ratio of one part water by weight to eight parts to fifteen parts of non-fully hydrated calcium chloride will produce the desired bonding action onto the dry materials and is therefore preferred.

The bonding range of the hydrated calcium chloride onto the dry mix solid can range from as low as 1% up to 50%, with the best range between 10% and 40%. In each case the water content for hydration purposes is increased or decreased as the aqueous coating agent, calcium chloride powder, percentages change.

The addition of urea to the aqueous adhering solution can offer many improvements and is therefore preferred. Urea is slightly hygroscopic and deliquescent, and has a low melting point. It is often used by itself as an ice melting agent because of its beneficial effect on vegetation and low corrosion properties.

There are two ways the unique properties of urea contribute to this invention. The first relates to its use as the dry material to be coated, elevating the temperature of that material and adding the solid coatant material which is non-fully hydrated calcium chloride. This process can achieve bonding without an adhering solution and has been explained in the previous section, "Dry material to be coated".

Urea in aqueous solutions exhibits different melting points. When urea is added to water, heated to its solubility point, sprayed on dry ice melt material, and then coated with calcium chloride powder, bonding will occur. Initially, one has the hydration effect of the water from the aqueous adhering solution reacting with calcium chloride powder. This heat of hydration will range from 140° F.–180° F., depending on the calcium chloride percentage. The higher the calcium chloride percentage, the higher the heat generated. The heat generated by the hydration plus the preheating of the aqueous urea solutions keeps the urea portion of the solution from solidifying too quickly. As the solution cools slowly, the urea will solidify, assisting in firming the bonding structure. See Examples #3 and #4 below.

The amount of addition of urea to the coating solution can range from ½ part urea to 3 parts water to 99 parts urea to 1 part water. The best range is 2 parts urea to 3 parts water to 5 parts urea and 1 part water. The addition of the urea to the aqueous coating solution will strengthen the coating bond, reduce the amount of water needed to hydrate the calcium chloride, and reduce fines generated in the mixing process.

The addition of potassium acetate to the adhering solution can improve the bonding process and is also preferred. Potassium acetate is an extremely hygroscopic product and primarily exists in commerce as an approximate 50% solution. This liquid solution of potassium acetate is often used as a liquid de-icer because it is biodegradable, effective to −15° F. in melting ice, and has low corrosion properties. It is well received as a runway de-icer at airports.

A potassium acetate aqueous solution can be used as the coating solution or in combination with urea. The potassium acetate solution has good penetration qualities and produces a sheen in the finished product.

Potassium acetate is most beneficial to the coating solution when it is being applied to ice melt dry mix materials such as sodium and potassium chloride. The ice melt dry mix material cited in previous examples has been urea. Examples 8–13 show addition of potassium acetate. When the surface of the dry mix material to be bonded is harder to penetrate, the addition of potassium acetate to the aqueous adhering solution is of benefit as illustrated in examples 8–13.

In summary, the inclusion of an aqueous solution of potassium acetate by itself or in combination with urea can improve the bonding process, in particular, when the dry ice melt material to be coated has a hard surface structure. For best results, potassium acetate can be used from 1 part potassium acetate to the range of 1 part water to 6 parts water in the aqueous adhering solution.

The addition of calcium and/or magnesium chloride to the adhering solution can also improve the bonding process. Both of these inorganic salts are used extensively as ice melting salts (i.e. in the dry mix materials here described), and also have wide usage as dust control agents in liquid form. These hygroscopic salts aid the adhering solution by keeping some of the water tied up, which helps in storage. Also, solutions of these salts take on a syrupy/tacky consistency which aids in the wetting and bonding of the powder to the dry material being coated. Examples 17 and 18 used calcium chloride and magnesium chloride solutions.

Commercial solutions of calcium and magnesium chloride are readily available. They are very cost effective to use as an adhering agent to improve bonding and storage capabilities. They may be best utilized in their commercial solution ranges of 25–35% by weight for liquid magnesium chloride and 25–49% for liquid calcium chloride.

To summarize briefly for the aqueous adhering solution, while water is useful, it is most preferred to use some additions to the adhering solution. Hygroscopic solutions of calcium and/or magnesium chloride will require less water in the coating action, aid in storage and add to the ice melting characteristics. The addition of urea to the adhering solution strengthens the bonding action, reduces the fines and reduces the water required for bonding. The addition of potassium acetate to the adhering solution enhances bonding and in particular aids in the penetration of hard surface material such as sodium and potassium chlorides. The aqueous adhering solution may be altered for different ice melt dry mix materials.

(3) Vegetation-Friendly Ice-Melting Composition

The inventors have now discovered that an ice melting composition can be formulated which is not harmful to vegetation and, in some instances, can actually improve the appearance of the vegetation with a greening effect. This formulation generally comprises from about 60–90 % non-fully hydrated calcium chloride or magnesium chloride by weight, with 70–80 % calcium chloride or magnesium chloride being preferred. Calcium chloride is preferred over magnesium chloride because it is a slightly better ice melter and is commercially available in a more concentrated form.

The second ingredient is a fertilizer, such as urea or potassium chloride in an amount of from about 10–40% by weight, and preferably from about 20–30% by weight. Urea is preferred over potassium chloride because the nitrogen component of urea has more of a greening effect on the vegetation.

For purposes of the aqueous coating solution, up to 30 parts urea to 1 part water may be used, in contrast to the formulation of 5 parts urea to 1 part water set forth above. In this vegetation-friendly deicing composition, the melted urea is used not only for its bonding ability but also for urea's ice-melting properties and its beneficial effect on vegetation.

(4) Mixing Vessel/The Mechanical Stirring Step)

Because of the hydration process, it is important that the mixing be done quickly. The dry material (10) to be coated is deposited into the mixing vessel (13) (see schematic). The mixing vessel (13) is started and uniformly mixed and the adhering solution (12) is added. It is important that the time period be limited to just enough time to allow a thorough wetting and coating of the particles of dry mix material. If the dry material is not thoroughly wetted and coated, then bonding will not be on all particles. If too much time elapses in mixing, the aqueous adhering solution will soak into the particles, and the urea portion (if present) will start to solidify, and as a result very little calcium chloride will hydrate onto the particles as a plastic-like coating.

A preferred mix time for the adhering solution after its addition is only 6–10 seconds, after which the coating agent calcium chloride powder 14, which is non-fully hydrated, is added. The extent of hydration of the calcium chloride powder will depend on the makeup of the coating solution and the quantity of calcium chloride powder employed. A typical time for partial hydration to dry appearance would range from 15 to 30 seconds. The whole mixing process after the dry material to be coated is deposited would seldom be over one minute and never over five minutes. If the material is mixed for a prolonged time, the material will over hydrate by pulling moisture from the surrounding environment and cause caking in the mixing process. To accomplish this short mix time a fluidized zone twin shafted paddle blender is a preferred mixing vessel. It was used in the examples. After mixing, the material is screened (16) and packaged (18).

With regard to the vegetation-friendly ice-melting composition, there are four distinct methods of manufacture. First, the calcium chloride can simply be combined with the urea in the mechanical mixing device in the ratios described above. As the melting action takes place, the resulting brines will comingle as they make their way to the edge of the surfaces onto the grass or vegetation. The disadvantage to this process is the final product's melting performance. At temperatures below the practical ice melting point of urea, 10°–25° F. above zero, only the calcium chloride will melt leaving the urea on the sidewalk until temperatures increase.

The preferred manufacturing method is as outlined for the regular ice-melting composition above which is superior to straight blending. In this process, urea is coated with 20 to 30 parts calcium chloride. Additional calcium chloride can then be blended in to reach the desired ratio of between 60–90 parts calcium chloride and up to 40 parts urea. This system is superior to straight blending since the ingredients act synergistically: the calcium chloride absorbs moisture and generates heat which dissolves the urea into a melting brine. This allows the urea to melt at much lower temperatures than it would be capable of in an independent blend. It also improves the co-mingling of the brines during the melting process.

Due to the larger amount of melted urea being used in this embodiment of the invention, if the urea is added too quickly in the mixing process, the product can congeal into a molten mass. The addition of 10–20 parts powdered calcium calcium during the mixing process drys out the melted urea quicker and lessens the potential of a molten mass forming. Also, the addition of the calcium chloride powder into the cooling urea improves the melting performance while maintaining the desired percentages of calcium chloride to urea.

A third method of manufacturing the vegetative-friendly composition includes depositing dry calcium chloride dihydrate or monohydrate into a mixer. As the mixer is engaged, the calcium chloride is lifted at the front end of the mixer such that it free falls inwardly in a cascading flow. The continuous free falling curtain exposes the surface are of the individual particles within the batch. Melted urea which has been heated just past its melting temperature of 270° F. is then sprayed onto the free falling curtain in the mixer. As the melted urea coats the calcium chloride, it cools and solidifies making a uniform coated particle. To assist in the cooling process, the mixer can have a cooling jacket. After the calcium chloride has been coated and cooled, it is transferred to a screening operation and then to a packaging bin. The advantage of this process is that the final product is uniform and no blending is required. Blending can lead to product separation in transfer, storage and packaging. The disadvantage is that the urea coating on the outside of the calcium chloride tends to hinder the melting ability of the product at lower temperatures.

A final method of manufacturing the vegetative-friendly composition is a variation of the preceding urea coating process which is altered slightly by the addition of calcium chloride powder. The process involves placing five parts of calcium chloride in a mixer and adding 1½ parts of melted urea followed by one part calcium chloride powder to more quickly dry out the sticky urea prior to cooling. This is followed by a second layer of 1½ parts of melted urea followed with one part calcium chloride. This final homogeneous product is the preferred composition of 30 part urea and 70 parts calcium chloride. It also contains an outside layer of calcium chloride that starts the melting action of the composition at lower temperatures.

(5) The Solid Coatant of Non-Fully Hydrated Calcium Chloride

The key component in the ice melt invention composition is the solid coating agent, i.e. non-fully hydrated calcium chloride. Calcium chloride dry material exists commercially as a monohydrate and dihydrate. When these forms of calcium chloride come into contact with water, they react in an exothermic manner since calcium chloride is a hygroscopic material. This ability of calcium chloride to absorb moisture makes it useful as an ice melter by itself or in combination with other ice melters that exhibit less hygroscopic qualities.

This invention uses the natural characteristics of calcium chloride to attract and hold moisture and generate heat. When this natural hydration process is controlled with a measured amount of moisture, a calcium chloride coating can be applied onto most dry mix solid material of ice melt compositions.

The process consists of the aqueous coating solution being applied to a solid material as earlier described in connection with the mixing vessel. As calcium chloride powder, preferably 80 mesh to 200 mesh, is applied to the mixture, the initial contact with the moisture will convert the calcium chloride to hexahydrate and tetrahydrate with a melting point of 85.8° F. and 113.5° F. respectively. The hydration heat generated will range from 120° F. to 180° F, depending on various calcium chloride ratios. This process allows the formation of a plastic mass that coats the dry mix solids which have previously been wetted with the adherent coating. This excess moisture continues to attract the calcium chloride powder until the free moisture has been totally dried up in the bonding process and the system is allowed to reach equilibrium.

Commercially available calcium chloride monohydrate, 94% or above, is ground to a fine powder, 80 mesh to 200 mesh. This material is very hygroscopic and is easily attracted to water. Various ice melting solids or aggregates can be coated with a measured amount of aqueous coating solution in a mechanical stirring device. The calcium chloride powder hydrates to the moisture on the solids, forming a strong bond. The coated material is discharged from the mixer to a screening operation and packaged.

Commercially available calcium chloride dihydrate, 77%–80% or above, can be used in place of the monohydrate. However, with the extra water content in the dihydrate (20%–33%) combined with the water from the aqueous coating solution, the product may be unstable in long-term storage. This is caused by the increased moisture in the dihydrate. If calcium chloride dihydrate is used, the resulting end product will need additional drying. See Examples #1 and #2 below.

The amount of a coatant of non-fully hydrated calcium chloride used as the solid coatant may vary within the range of from 1% to 50%, and for best results from 10% to 40%.

The following examples are offered to further illustrate, but not limit, both the composition and the process of the present invention.

EXAMPLES 1 & 2

|  | #1 | #2 |
|---|---|---|
| Ice melt solid | 100 parts | 100 parts |
| Aqueous adhering solution |  |  |
| Water content | 3 parts | 3 parts |
| Coating agent |  |  |
| Calcium chloride |  |  |
| monohydrate, 96%, | 30 parts |  |
| dihydrate, 77%, |  | 30 parts |
| Approximate moisture | 4.2% | 9.9% |

In Example #1 above, the additional water content plus the approximately 4% water in the calcium chloride monohydrate results in a moisture content of 4.2% and effectively changes the calcium chloride from 96% material to 86% when the end product reaches equilibrium. This product is very stable in storage and does not require additional processing, such as drying.

In Example #2 above, the additional water content plus the approximately 23% water in the calcium chloride dihydrate will result in a moisture content of 9.9% and will effectively change the calcium chloride from 77% material to 67% which would approach questionable long-term storage and would advisably require additional drying.

(EXAMPLES 3 & 4 DEMONSTRATING USE OF UREA IN THE ADHERING SOLUTION)

|  | #3 | #4 |
|---|---|---|
| Ice melt solid | 100 parts | 100 parts |
| urea |  |  |
| Aqueous adhering solution |  |  |
| water | 3 parts | 3 parts |
| urea | 3 parts |  |
| Coating agent |  |  |
| calcium chloride | 30 parts |  |
| monohydrate, 96% |  | 30 parts |

To test the strength of the bond to abrasion, product from #3 and #4 above were screened through a #14 screen. One thousand grams from each sample were placed on a #16 screen and vibrated for 30 minutes on a roto-tap vibrating screen. The results showed #3 (water and urea) produced 1.5% fines and #4 (water alone) produced 2.8% fines. The addition of the urea in the coating solution improved the strength of the bond. Also, the tackiness nature of the solution aided the calcium chloride powder in adhering to the ice melt solid as noticeably less fines were observed in Example #3 as compared to #4.

For storage purposes and to keep the material free flowing, it is highly desirable to use as small an amount of water as possible and still achieve effective bonding. The following Examples 5-7 show that the addition of urea in aqueous solution and heating the solution to its solubility can reduce the amount of water needed to effect the hydration coating with powdered calcium chloride.

(EXAMPLES 5-7 ARE UREA EXAMPLES)

|  | #5 | #6 | #7 |
|---|---|---|---|
| Ice melt solid urea | 100 parts | 100 parts | 100 parts |
| Aqueous adhering solution |  |  |  |
| water | 2 parts | 2 parts | 1 part |
| urea | 3 parts | 4 parts | 5 parts |
| Coating agent calcium chloride monohydrate, 96% | 30 parts | 30 parts | 30 parts |

Examples #5, #6, #7 were mixed, coated and placed in a lab oven at 120° F. for five days to assimilate storage conditions. At the end of the test period all samples were free flowing. It is possible to use even more concentrated solutions of urea than shown in the above examples.

(EXAMPLES 8-13 SHOWING ADHERING SOLUTION ADDITIONS)

|  | #8 | #9 | #10 | #11 | #12 | #13 |
|---|---|---|---|---|---|---|
| Ice melt solid potassium chloride | 100 | 100 | 100 | 100 | 100 | 100 |
| Aqueous adhering solution |  |  |  |  |  |  |
| water | 3 | 3 | 4.5 | 6 | 3 | 3 |
| urea | 1 | 2 | 3 | 4 | 2 |  |
| potassium acetate | .5 | 1 | 1.5 | 2 | 1 | 3 |
| Solid coating agent calcium chloride monohydrate, 96% | 25 | 25 | 37.5 | 50 | 30 | 30 |

(EXAMPLES 14-15 SHOW "SALT" AS THE DRY MIX)

|  | #14 | #15 |
|---|---|---|
| Ice melt solid sodium chloride | 100 | 100 |
| Aqueous adhering solution |  |  |
| water | 3 | 3 |

-continued

|  | #14 | #15 |
|---|---|---|
| urea | 2 | 1 |
| potassium acetate | 1 | .5 |
| Solid coating agent calcium chloride monohydrate, 96% | 30 | 30 |

Examples #8 through #15 were mixed and placed in a lab oven at 120° F. for five days to assimilate storage conditions. At the end of the test period, all samples were free flowing.

(EXAMPLES #17 AND #18 SHOWING CALCIUM CHLORIDE AND MAGNESIUM CHLORIDE SOLUTION AS THE ADHERING AGENT)

|  | #17 | #18 |
|---|---|---|
| Ice melt base urea | 100 parts | 100 parts |
| Aqueous adhering solution |  |  |
| water | 3 | 3 |
| calcium chloride | 1.5 |  |
| magnesium chloride |  | 1.5 |
| Solid coating agent calcium chloride monohydrate, 96% | 30 | 30 |

Examples #17 and #18 were mixed, placed in a lab oven at 120° F. for five days to assimilate storage conditions. At the end of the test period, all samples were free flowing.

The present invention very successfully addresses the shortcomings of various aggregates now available as ice melt compositions. By coating the aggregate with calcium chloride, which is non-fully hydrated, it quickly melts and embeds the aggregate into the ice and snow. Should the melted liquid refreeze, the aggregate remains, providing needed traction. Examples 19-22 below show benefits of the overall composition.

(EXAMPLES 19-22)

|  | #19 | #20 | #21 | #22 |
|---|---|---|---|---|
| Dry material to be coated |  |  |  |  |
| sand/gravel mix | 200 parts | 200 parts |  |  |
| diatomaceous earth absorbents |  |  | 60 parts | 60 parts |
| Aqueous adhering solution |  |  |  |  |
| water | 2 | 4 | 5 | 4 |
| urea | 4 | 8 | 10 | 6 |
| Solid coating agent powdered calcium chloride monohydrate, 96% | 30 | 60 | 20 | 20 |

Examples #19 through #22 were mixed, placed in a lab oven at 120° F. for five days to assimilate storage conditions. At the end of the test period all samples were free flowing.

The benefits of coating aggregates such as sand/gravel for quick traction are quite apparent. The coating of diatomaceous earth absorbents accomplishes a dual function. The first, embedding of non-slip absorbents into ice and snow, has already been pointed out. The second benefit of the diatomaceous earth products is their absorbent function. As the calcium chloride coating melts ice, the liquid brine is quickly absorbed into the calcined diatomaceous earth absorbent. This keeps the liquid brine that is generated from the melting action from penetrating into the concrete surface. Spalling of concrete can be accelerated by ice melters because they increase the freeze/thaw cycles. Ice melters generate a liquid brine. This brine solution lowers the freezing point of water and melts ice and snow on contact. The brine continues to melt until it can no longer lower the freeze point of water. Depending on conditions, time, temperature, concentration, etc., the melted solution can and does refreeze. This refreezing can cause concrete damage, especially in new concrete that has not cured yet. The use of a diatomaceous earth absorbent coated with calcium chloride would keep the majority of the brine solution from penetrating into the concrete surface. This would be of benefit, especially on new concrete.

The data below for samples 1–16 test the performance characteristics of the product. To do this, several of the samples were placed in a lab freezer at +15° F. for one hour. The samples consisted of ice that was prefrozen in plastic cylinders. The amount of ice melter placed in each of the cylinders was calculated to simulate actual usage rates.

At the end of one hour the amount of melted material was poured off and measured. The samples were repeated four times, and the average melting ratios were compared. For example, if one gram melted one gram of liquid brine in one hour, the melting ratio would be one.

The average temperature of +15° F. was used, as fertilizers will not melt at this temperature. The results of these comparisons follow:

Table I below shows best results with urea, or urea blended with calcium chloride and urea coated with calcium chloride solid coating agent.

TABLE I

Comparison: Urea. Urea blended with calcium chloride, and urea coated with calcium chloride. (Sample Numbers 1–7)

| Sample No. | Average Melting Ratio |
|---|---|
| 1 | 0 |
| 2 | 1.1 |
| 3 | 1.3 |
| 4 | 1.3 |
| 5 | 1.6 |
| 6 | 1.7 |
| 7 | 1.9 |

Sample #1—Consisted of urea only and did not register any measurable amount of melted brine.
Sample #2—The equivalence of 25% calcium chloride with no other melting agents present.
Sample #3—A physical blend of 25% calcium chloride and 75% urea.
Sample #4—A 12% coating of calcium chloride onto urea as described in the preceding sections.
Sample #5—A 22% coating of calcium chloride onto urea as described in the preceding sections.
Sample #6—A 25% coating of calcium chloride onto urea as described in the preceding sections.
Sample #7—A 28% coating of calcium chloride onto urea as described in preceding sections.

A review of the results would indicate that as the calcium chloride ratio is increased, the melting ratio is increased.

TABLE II

Comparison: Potassium chloride and potassium chloride coated with calcium chloride (Sample Numbers 8, 9 and 10)

| Sample No. | Grams Melted Per Unit |
|---|---|
| 8 | 0 |
| 9 | .22 |
| 10 | .84 |

Sample 8—Consisted of potassium chloride only and did not register any measurable amount of melted brine.
Sample 9—A 7.4% coating of calcium chloride onto potassium chloride as described in the preceding sections.
Sample 10—A 15.3% coating of calcium chloride onto potassium chloride as described in the preceding sections.

A review of the results would indicate that as the calcium chloride ratio is increased, the melting ratio is increased.

TABLE III

Comparison: Sodium chloride and sodium chloride coated with calcium chloride.

| Sample No. | Grams Melted Per Unit |
|---|---|
| 11 | 1.42 |
| 12 | 2.02 |
| 13 | 2.15 |

Sample 11—Consisted of sodium chloride only.
Sample 12—A 7.7% coating of calcium chloride onto sodium chloride as described in the preceding sections.
Sample 13—A 13.7% coating of calcium chloride onto sodium chloride as described in the preceding sections.

A review of the results would indicate that as the calcium chloride ratio is increased, the melting ratio is increased.

In summary, although the various chemical de-icers have significantly different performance levels, they all work in much the same way. None is capable of melting snow and ice in its solid state, but must first come into contact with sufficient moisture to dissolve and form a brine. The brine lowers the freezing point of water and melts ice and snow on contact. The addition of the coating agent calcium chloride to various dry ice melters will allow those melters to form a brine quicker and at lower temperatures than they would without the coating or in a blended formula. Clearly, the addition of a calcium chloride coating onto urea, potassium chloride and sodium chloride enhances their melting performance.

To test the benefits of coating aggregates such as sand, the following comparisons were made. A large block of ice was frozen in a plastic container. Three samples of aggregates were spread on the ice at similar rates. The block of ice was raised at an angle until the aggregate slid to the bottom of the container. All aggregate samples were identical with the exception that samples B and C were coated with 12% and 22% calcium chloride solid coatant respectively.

The steps in the process of the test involved adding the aggregate on the ice pan, raising the pan, and when the aggregate slid to the bottom of the pan, the angle was measured.

Sample 14—Aggregate only, achieved an angle of 45°–50° before sliding to the bottom.

Sample 15—Aggregate coated with 12% calcium chloride achieved an angle of 90° and none of the aggregate slid to the bottom.

Sample 16—Aggregate coated with 22% calcium chloride achieved an angle of 90° and none of the aggregate slid to the bottom.

The results indicate a considerable advantage for aggregates coated with calcium chloride to embed into ice for traction.

To measure the effectiveness of calcined diatomaceous earth absorbents coated with calcium chloride to effectively melt and reabsorb the melted liquid, the following test was done. Calcined diatomaceous earth absorbent coated with calcium chloride was placed on five samples of frozen ice in plastic cylinders and placed in a lab freezer for one hour at 15° F. After one hour, visual observations indicated no free melted brine in the cylinders. The absorbents appeared to be wet which would indicate all melted material is being picked up and reabsorbed. The absorbents were combined from the test samples, weighed, and placed on a moisture balance scale, moisture removed and reweighed. A review of the test data follows.

| Mixture of Dry Composition | |
|---|---|
| absorbent solid | 60 parts |
| Adhering Solution | |
| water | 5 parts |
| urea | 10 parts |
| Solid Coating Agent of Non-Fully Hydrated Calcium | |
| calcium chloride monohydrate, 96% | 20 parts |

7.16/grams of the above composition were placed on ice for one hour. At the end of one hour the material was reweighed at 12.24/grams. After the removal of all moisture on the sample plus moisture and urea in the coating solution, a net gain of 5.08/grams of water was calculated as being reabsorbed by the absorbent. At 15° F. one part calcium chloride will melt 3 to 3.5 parts ice to water. Based on the moisture pick up in this test, the 1.5/grams of the calcium chloride coated on the absorbent were totally utilized.

EXAMPLE 23

Determination of Ideal Ingredient Ratios for Vegetative-Friendly Composition (1) Effects on Turf Grasses To find the best ratio of ice melter to fertilizer, the following test was conducted at Iowa State University Department of Horticulture. Brine solution ice melter study: Individual experimental plots were 2 ft×4 ft with three replications. Because of possible ice melter runoff, each individual plot was completely surrounded by a one foot border.

Treatments containing 30% urea+70% calcium chloride monohydrate, 50% urea+50% calcium monohydrate, 67% urea+33% calcium chloride monohydrate, urea, rock salt, 50% salt+potassium chloride, magnesium chloride hexahydrate, and calcium chloride monohydrate were evaluated. A control was treated with only water for comparison. Treatment rates of 2, 4, and 8 ounces per square yard were used for nine applications to simulate typical amounts of product used in the ice melt industry (Table IV). Treatments were randomly placed within each replication. The ice melters were dissolved in water and applied using a carbon dioxide backpack sprayer. TeeJet flat fan EVS#8008, white nozzles were used at 45 psi. Windbreak "cages" were employed to prevent drift of the materials. No run-off or drift was observed after treatment differences became apparent. Nine applications were made beginning Feb. 22, 1996, and ending on Mar. 19, 1996. A deer "cannon" was placed to minimize browsing damage.

Phytotoxicity and percent living plant material data were taken for the brine study on Apr. 10, 1996 and May 9, 1996 (Table IV). Phytotoxicity was assessed using a scale from 10 to 1 with 10=no injury and 1=foliage completely brown. Percent living material was estimated as the percentage of green plant material per plot. Some of the plots, especially those treated with rock salt, were damaged by deer browsing. In these plots, the remaining plant material was considered to represent the entire plot in the data collection.

TABLE IV

| | | Total | Field Plots | | | | | |
|---|---|---|---|---|---|---|---|---|
| | Rate | applied | Phytotoxicity[1] | | | % Living green plant material[2] | | |
| Ice melter product | oz/yd² | oz/yd² | April 10 | May 9 | Mean | April 10 | May 9 | Mean |
| 1 Untreated Control | NA | NA | 7.7 | 9.7 | 8.7 | 53 | 98 | 76 |
| 2 30% Urea + 70% CaCl₂ | 2 | 18 | 5.7 | 8.7 | 7.2 | 48 | 97 | 73 |
| 3 30% Urea + 70% CaCl₂ | 4 | 36 | 2.7 | 3.0 | 2.8 | 20 | 26 | 23 |
| 4 30% Urea + 70% CaCl₂ | 8 | 72 | 1.0 | 1.0 | 1.0 | 0 | 1 | 1 |
| 5 50% Urea + 50% CaCl₂ | 2 | 18 | 5.0 | 6.0 | 5.5 | 40 | 83 | 62 |
| 6 50% Urea + 50% CaCl₂ | 4 | 36 | 1.7 | 1.3 | 1.5 | 3 | 1 | 2 |
| 7 50% Urea + 50% CaCl₂ | 8 | 72 | 1.0 | 1.0 | 1.0 | 0 | 1 | 1 |
| 8 67% Urea + 33% CaCl₂ | 2 | 18 | 2.3 | 3.0 | 2.7 | 8 | 22 | 15 |
| 9 67% Urea + 33% CaCl₂ | 4 | 36 | 1.0 | 1.0 | 1.0 | 0 | 1 | 1 |
| 10 67% Urea + 33% CaCl₂ | 8 | 72 | 1.0 | 1.0 | 1.0 | 0 | 1 | 1 |
| 11 KCl | 2 | 18 | 5.0 | 7.7 | 6.3 | 28 | 88 | 58 |
| 12 KCl | 4 | 36 | 2.0 | 3.3 | 2.7 | 3 | 27 | 15 |
| 13 KCl | 8 | 72 | 1.0 | 1.0 | 1.0 | 0 | 1 | 1 |
| 14 Urea | 2 | 18 | 1.7 | 1.3 | 1.5 | 3 | 2 | 3 |
| 15 Urea | 4 | 36 | 1.0 | 1.0 | 1.0 | 0 | 1 | 1 |
| 16 Urea | 8 | 72 | 1.0 | 1.0 | 1.0 | 0 | 1 | 1 |
| 17 Rock Salt | 2 | 18 | 5.0 | 7.0 | 6.0 | 25 | 82 | 53 |

TABLE IV-continued

|  | Rate oz/yd² | Total applied oz/yd² | Field Plots | | | | | |
|---|---|---|---|---|---|---|---|---|
| | | | Phytotoxicity[1] | | | % Living green plant material[2] | | |
| Ice melter product | | | April 10 | May 9 | Mean | April 10 | May 9 | Mean |
| 18 Rock Salt | 4 | 36 | 1.7 | 1.7 | 1.7 | 3 | 12 | 8 |
| 19 Rock Salt | 8 | 72 | 1.0 | 1.0 | 1.0 | 0 | 1 | 1 |
| 20 50% Salt + 50% KCl | 2 | 18 | 4.7 | 7.7 | 6.2 | 28 | 82 | 55 |
| 21 50% Salt + 50% KCl | 4 | 36 | 2.3 | 4.3 | 3.3 | 8 | 55 | 32 |
| 22 50% Salt + 50% KCl | 8 | 72 | 1.0 | 1.0 | 1.0 | 0 | 1 | 1 |
| 23 MgCl₂ (47% a.i.) | 4 | 39 | 2.7 | 5.0 | 3.8 | 8 | 57 | 33 |
| 24 MgCl₂ (47% a.i.) | 9 | 77 | 1.3 | 1.0 | 1.2 | 0 | 1 | 1 |
| 25 MgCl₂ (47% a.i.) | 17 | 153 | 1.0 | 1.0 | 1.0 | 0 | 1 | 1 |
| 26 CaCl₂ Pellets | 2 | 18 | 4.0 | 7.7 | 5.8 | 27 | 93 | 60 |
| 27 CaCl₂ Pellets | 4 | 36 | 1.7 | 2.7 | 2.2 | 2 | 24 | 13 |
| 28 CaCl₂ Pellets | 8 | 72 | 1.0 | 1.0 | 1.0 | 0 | 1 | 1 |
| LSD$_{0.05}$ | | | 0.9 | 1.2 | 0.9 | 9 | 17 | 11 |

[1]Phytotoxicity was assessed using a scale from 10 to 1 with 10 = no injury and 1 = foilage completely brown
[2]Percent living plant material was assessed as percentage of green per plot In Table IV, Fisher's least significant difference (LSD) tests were used to compare the effects of the ice melters on turf grass phytotoxicity and percent living material.

Vegetation damage from ice melters occurs from over application and frequent application. For comparison purposes, heavy application rates were utilized in Table IV to ensure that some damage would occur. Also, comparisons were made on exact ounces per square yard between the material.

The results of Table IV indicate that all samples had considerable damage at total application rates of 36 ounces and over. The total application rates of 18 ounces per square yard provide comparative data. From this information, we can make comparisons of the various ice melters tested:

TABLE V

| | Phytotoxicity |
|---|---|
| Untreated | 8.7 |
| 30% urea + 70% calcium chloride | 7.2 |
| potassium chloride | 6.3 |
| 50% salt + 50% potassium chloride | 6.2 |
| calcium chloride | 5.8 |
| 50% urea + 50% calcium chloride | 5.5 |
| | Percent living green plant material |
| Untreated | 76 |
| 30% urea + 70% calcium chloride | 73 |
| 50% urea + 50% calcium chloride | 62 |
| calcium chloride | 60 |
| potassium chloride | 58 |
| 50% salt + 50% potassium chloride | 55 |

The results set forth in Table V clearly indicate that the safest ice melter was 30% urea+70% calcium chloride.

(2) Melting Characteristics

The melting characteristics of the formulation 30% urea+70% calcium chloride manufactured by utilizing the preferred coating technique was compared to other traditional ice melters. The comparisons were made at 5° F. for 20 minutes and the results are set forth in Table VI:

TABLE VI

Melting Comparisons

| Composition | Milliliters |
|---|---|
| 30% urea + 70% calcium chloride | 6.8 |
| potassium chloride | 0 |
| urea | 0 |
| rock salt (sodium chloride) | 1.5 |
| Safe Step ® (50% salt + 50% KCl) | 1.2 |
| magnesium chloride | 5.7 |
| calcium chloride | 8.6 |

The results in Table VI clearly show that the 30% urea+70% calcium chloride is a low temperature melter. With the exception of straight calcium chloride, the 30% urea+70% calcium chloride formulation is the superior ice melter.

In summary, the coating of calcined diatomaceous earth absorbents with calcium chloride is an excellent way of removing melted brine from concrete surfaces and to keep it from entering the concrete surfaces and refreezing. Further, the compositions of between 60–90 parts calcium chloride and between 10–40 parts urea is a superior low temperature ice melter which has beneficial effects on surrounding vegetation.

In total, the coating process outlined is quite versatile and offers improvements in ice melting performance for dry ice melting compounds, aggregates and absorbents and achieves the objectives of the invention as the data demonstrates.

What is claimed is:

1. A process of preparing a uniform free flowing vegetation-friendly ice melting composition, said process comprising: admixing an ice melter selected from the group consisting of non-fully hydrated calcium chloride and non-fully hydrated magnesium chloride with a fertilizer selected from the group consisting of potassium chloride and urea; uniformly coating for a time sufficient such that the ice melter and fertilizer are tacky and wetted but such that the fertilizer does not soak into the ice melter;

applying as a solid coating non-fully hydrated calcium chloride particles, wherein the calcium chloride particles have a size of from 80 mesh to 200 mesh; and thereafter quick mixing for from one minute to five minutes to provide a second coating surrounding the added dry materials mix; and thereafter screening and packaging the ice melt composition.

2. A process according to claim 1 wherein the ice melter is non-fully hydrated calcium chloride.

3. A process according to claim 1 wherein the fertilizer is urea.

4. A process according to claim 1 wherein the solid coating of non-fully hydrated calcium chloride is the monohydrate.

5. A process according to claim 1 wherein the solid coating of non-fully hydrated calcium chloride is the dihydrate.

6. A process according to claim 1 wherein the amount of ice melter added during the admixing step is from about 60–90 parts by weight and the amount of fertilizer added is from about 10–40 parts by weight.

7. A process according to claim 6 wherein the amount of ice melter is from about 70–80 parts by weight and the amount of fertilizer is from about 20–30 parts by weight.

8. A process according to claim 7 wherein the amount of ice melter is about 70 parts by weight and the amount of fertilizer is about 30 parts by weight.

9. A process of preparing a uniform free-flowing vegetation-friendly ice melting composition comprising:

slowly admixing about 50 parts by weight of non-fully hydrated calcium chloride with from about 20–30 parts by weight urea;

uniformly coating the calcium chloride with the urea to form coated calcium chloride;

adding from about 10–20 parts by weight non-fully-hydrated calcium chloride to the coated calcium chloride;

quick mixing from about one minute to five minutes to provide a second coating surrounding the coated calcium chloride; and thereafter screening and packaging the ice melt composition.

10. The product of the process of claim 9.

11. A vegetation-friendly ice melting composition comprising:

a first layer of ice melter selected from the group consisting of non-fully hydrated calcium chloride and non-fully hydrated magnesium chloride;

a second layer of fertilizer on said first layer of ice melter wherein the fertilizer is selected from the group consisting of urea and potassium chloride;

a third layer of ice melter on said second layer of fertilizer wherein the third layer of ice melter is selected from the group consisting of non-fully hydrated calcium chloride and non-fully hydrated magnesium chloride;

wherein said vegetation-friendly ice melting composition has an overall concentration of from about 60–90 parts by weight ice melter and from about 10–40 parts by weight fertilizer.

12. An ice melting composition according to claim 11 wherein the ice melter is non-fully hydrated calcium chloride and the fertilizer is urea.

13. An ice melting composition according to claim 12 wherein the composition has an overall concentration of about 70 parts by weight calcium chloride and about 30 parts by weight urea.

* * * * *